United States Patent [19]

Tani et al.

[11] Patent Number: 5,294,460
[45] Date of Patent: Mar. 15, 1994

[54] METHOD FOR THE PREPARATION OF SILICON CARBIDE-CARBON FIBER COMPOSITE

[75] Inventors: Eiji Tani; Kazuhisa Shobu; Tadahiko Watanabe, all of Tosu, Japan

[73] Assignee: Japan as represented by Director General of Agency of Industrial Science and Technology, Tokyo, Japan

[21] Appl. No.: 961,311

[22] Filed: Oct. 15, 1992

[30] Foreign Application Priority Data

Nov. 20, 1991 [JP] Japan ................... 3-332520

[51] Int. Cl.⁵ ............................ B05D 3/02
[52] U.S. Cl. ...................... 427/228; 427/379; 427/399; 427/419.7
[58] Field of Search ............ 427/228, 399, 379, 419.7, 427/229

[56] References Cited

U.S. PATENT DOCUMENTS

| | | | |
|---|---|---|---|
| 3,079,273 | 2/1963 | Johnson | 427/228 |
| 3,385,723 | 5/1968 | Pickar | 427/228 |
| 3,628,985 | 6/1969 | Hider et al. | 427/228 |
| 4,696,827 | 9/1987 | Okamura et al. | 427/228 |
| 5,196,235 | 3/1993 | Parlier et al. | 427/228 |

FOREIGN PATENT DOCUMENTS 3311553 10/1984 Fed. Rep. of Germany ...... 427/228

*Primary Examiner*—Janyce Bell
*Attorney, Agent, or Firm*—Wenderoth, Lind & Ponack

[57] ABSTRACT

A novel method is disclosed for the preparation of a silicon carbide-based composite ceramic body reinforced with carbon fibers having an outstandingly high mechanical strength. The method comprises impregnating carbon fibers with a mixture of fine silicon particles and a thermosetting resin such as a phenolic resin to give a carbon fiber compact body impregnated with the mixture, which is then subjected to a heat treatment at about 1400° C. in an inert atmosphere so that the thermosetting resin is thermally decomposed to produce free carbon capable of reacting with the silicon particles without affecting the carbon fibers embedded in the matrix due to the preferential reactivity of the silicon particles with the free carbon produced from the resin thus not to decrease the reinforcing effect of the carbon fibers.

7 Claims, 1 Drawing Sheet

METHOD FOR THE PREPARATION OF SILICON CARBIDE-CARBON FIBER COMPOSITE

BACKGROUND OF THE INVENTION

The present invention relates to a method for the preparation of a silicon carbide-carbon fiber composite material or, more particularly, to a method for the preparation of a silicon carbide-based ceramic material reinforced with carbon fibers without causing a decrease in the mechanical strength, which method is applicable to a ceramic body of any complicated forms.

It is a noteworthy fact in recent years that the application fields of silicon carbide-based ceramic materials are rapidly expanding as a material of structural members working at extremely high temperatures, as a corrosion-resistant material and as an abrasion-resistant material in respect of the excellent high-temperature stability, corrosion resistance and abrasion resistance thereof.

On the other hand, intensive investigations are recently under way to develop a composite ceramic material reinforced with a fibrous reinforcing material with an object to improve the toughness of ceramic materials. For example, silicon carbide-based composite ceramic materials reinforced with a fibrous reinforcing material are prepared usually by blending a powder of silicon carbide and reinforcing fibers and subjecting the blend to sintering in a hot press or by the method of chemical vapor infiltration. The hot-press sintering method, however, is disadvantageous because full sintering can be achieved only by the admixture of the blend with a substantial amount of a sintering aid or by undertaking sintering at a high temperature of 1700° C. or even higher unavoidably resulting in a decrease in the mechanical strength of the sintered body in addition to the limitation that the method is hardly applicable to the preparation of a sintered body having a complicated form. The chemical vapor infiltration method, on the other hand, has problems that the time taken for the infiltration is usually so long that the productivity of the process is low and the reactant gases used for the method, such as methyltrichlorosilane, sometimes have toxicity although the temperature for the process is not so high as in the hot-press sintering method and the method is applicable to the preparation of a ceramic body having a relatively complicated form.

As a method for the preparation of silicon carbide-based ceramic materials, a proposal is made for a method involving in situ formation of silicon carbide by a chemical reaction. For example, a green compact body composed of particles of silicon carbide and particles of graphite is infiltrated with a melt of elementary silicon so that silicon carbide is formed in situ by the reaction of the graphite particles and the molten silicon. A problem in this method is that the molten silicon must be at a high temperature of 1600° C. or higher in order to effect smooth and complete infiltration of the green compact body with the molten silicon despite the melting point of elementary silicon of about 1410° C.

Further, a method is proposed in American Ceramic Society Bulletin, volume 65, No. 2, pages 326 to 335 (1986) for the preparation of a fiber-reinforced silicon carbide-based composite ceramic material by utilizing the reaction between carbon of a carbon fiber-reinforced carbon composite and silicon, according to which a composite body of carbon fibers in a carbon matrix is infiltrated with molten silicon to effect the reaction between the carbon matrix and the molten silicon so that a silicon carbide-based composite ceramic body reinforced with carbon fibers can be obtained. This method has problems that the reaction cannot proceed uniformly throughout the compact body and the reaction of the molten silicon may take place not only with the carbon matrix but also with the carbon fibers thus to decrease the reinforcing effect of the carbon fibers. Therefore, it is generally understood that the infiltration method with molten silicon is not suitable for the preparation of a silicon-carbide-based composite ceramic body reinforced with carbon fibers.

Alternatively, a method is proposed in Journal of Japan Ceramic Society, volume 94, No. 5, pages 512 to 516 (1986) for the preparation of a sintered body of silicon carbide by subjecting a blend of powders of silicon and carbon to the process of pressurized self-combustion sintering. This method has almost no prospect of industrialization because sintering therein must be performed at an extremely high temperature of 2000° C. or higher and under a high pressure of at least 3 GPa if not to mention the inapplicability of the method to the preparation of a carbon fiber-reinforced silicon carbide body.

SUMMARY OF THE INVENTION

The present invention accordingly has an object to provide a novel method for the preparation of a silicon carbide-based composite ceramic body reinforced with carbon fibers without the above described problems and disadvantages in the prior art methods.

Thus, the method of the present invention for the preparation of a silicon carbide-based composite ceramic body reinforced with carbon fibers comprises the steps of:

(a) mixing particles of elementary silicon and a thermosetting resin, such as phenolic resins, in such a proportion that the molar ratio of the silicon and the carbon in the thermosetting resin is in the range from 0.3 to 1.2 to form a mixture;

(b) impregnating carbon fibers with the mixture prepared in step (a) to form a green carbon fiber compact impregnated with the mixture of the silicon particles and the thermosetting resin; and (c) heating the green carbon fiber compact at a temperature in the range from 1300° C. to 1500° C. in an atmosphere of an inert gas to effect thermal decomposition of the thermosetting resin forming free carbon and to effect the reaction of the silicon particles with the free carbon produced from the thermosetting resin to form silicon carbide.

DETAILED DESCRIPTION OF THE PREFERRED EMBODIMENTS

Figure 1:
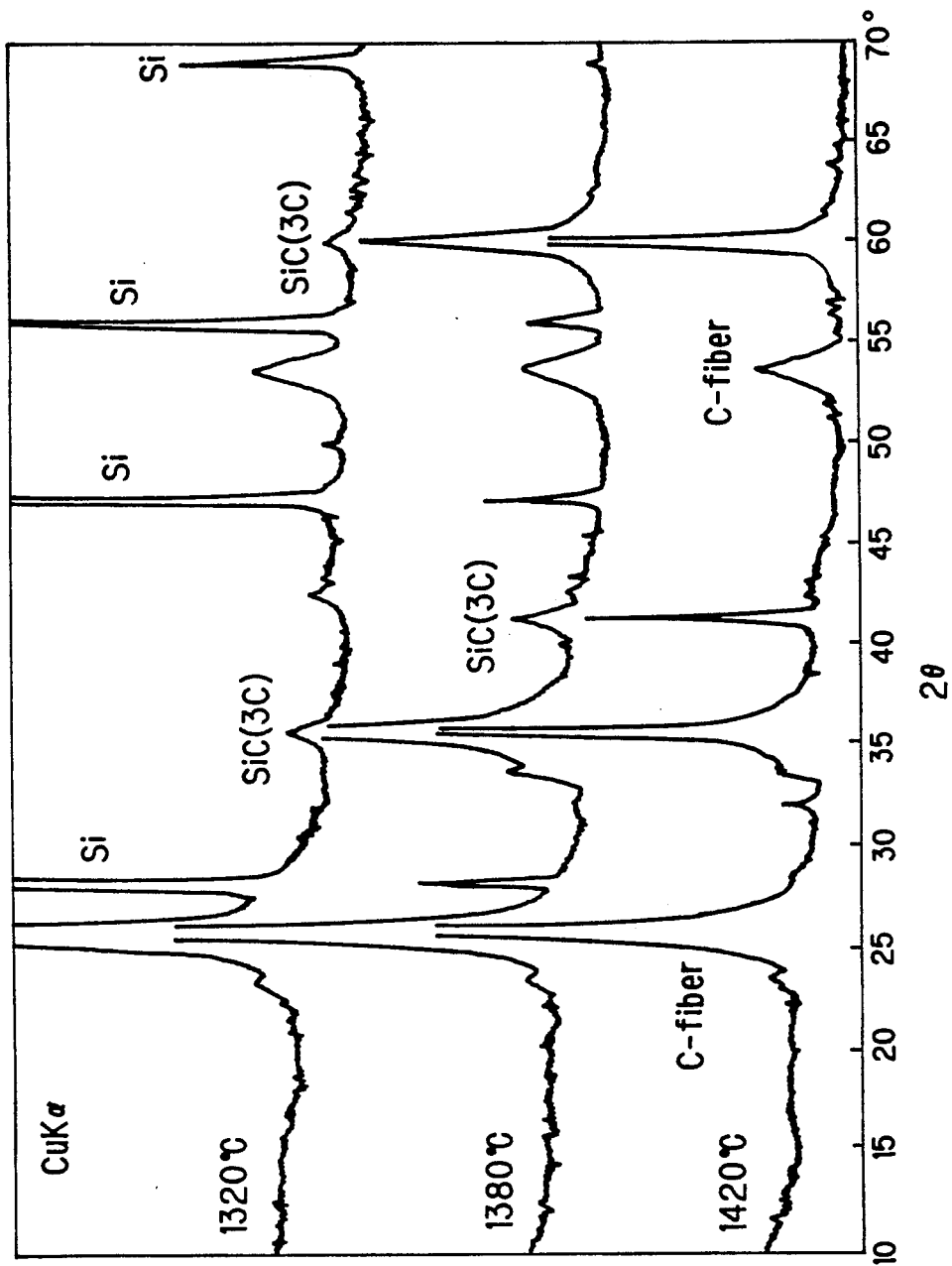
FIG. 1 is an X-ray powder diffractometric diagram of the composite material after a heat treatment for 1 hour at different temperatures.

As is described above, the inventive method comprises the essential steps (a) for the preparation of a mixture of particles of elementary silicon and a thermosetting resin, (b) for the impregnation of carbon fibers with the above prepared mixture to form a carbon fiber compact impregnated with the thermosetting resin and silicon particles and (c) for the heat treatment of the carbon fiber compact to thermally decompose the thermosetting resin producing free carbon which reacts with the silicon particles to form silicon carbide in situ. It is a quite unexpected discovery that, in step (c) above, the free carbon produced by the thermal decomposition of the thermosetting resin is amorphous and highly reactive with silicon particles so that the reaction of the silicon particles takes place preferentially with the free carbon produced from the thermosetting resin even at a temperature lower than the melting point of silicon and not with the carbon fibers. Accordingly, the carbon fibers in the completed composite material remain intact in the reaction between silicon and carbon. This is presumably the reason for the unexpectedly high mechanical strength of the silicon carbide-based composite body reinforced with carbon fibers as prepared according to the inventive method.

The particles of elementary silicon to be blended with a thermosetting resin in step (a) should have a particle diameter as fine as possible or, usually, not exceeding 20 μm or, preferably, not exceeding 10 μm in order that the carbon fiber compact can be densely impregnated with the mixture of the silicon particles and the thermosetting resin. The purity of the silicon particles is not particularly limitative but desirably should be as high as possible or at least 99% by weight.

The mixture of a thermosetting resin and the silicon particles prepared in step (a) should be in the form of a slurry so that the thermosetting resin should be in the form of a liquid prepolymer or a solid prepolymer soluble in an organic solvent. Examples of suitable thermosetting resins include phenolic resins, epoxy resins, furan resins and the like, of which phenolic resins are preferred. Pitches can also be used in place of the above mentioned thermosetting resins. If the resin is too viscous or in the form of a solid, the prepolymer of the thermosetting resin is admixed with or dissolved in an organic solvent in order to have a viscosity suitable for impregnation of the carbon fiber compact.

The blending proportion of the silicon particles and the thermosetting resin to form a slurry mixture is selected in such a range that the molar ratio of silicon to the carbon contained in the thermosetting resin is in the range from 0.3 to 1.2 or, preferably, from 0.6 to 1.0 or, more preferably, from 0.9 to 1.0. When this molar ratio is too low, a large portion of the free carbon produced by the thermal decomposition of the thermosetting resin would remain as unreacted. When the molar ratio is too high, on the other hand, a part of the elementary silicon remains even after complete exhaustion of the free carbon produced by the thermal decomposition of the thermosetting resin and would eventually react with the carbon fibers resulting in a decrease in the reinforcing effect of the carbon fibers.

In step (b) of the method, carbon fibers are impregnated with the mixture of silicon particles and a thermosetting resin prepared in step (a) to form a carbon fiber compact impregnated with the mixture. The type of the carbon fibers is not particularly limitative including those prepared from a polyacrylonitrile resin and those prepared from a pitch material. The carbon fibers should have a diameter in the range from 5 to 20 μm or, preferably, from 5 to 12 μm. Commercially available carbon fiber products of the low-temperature type having a fiber diameter of about 10 μm can be used quite satisfactorily. The procedure for the impregnation of carbon fibers with the slurry mixture is also not particularly limitative and any conventional methods are applicable. For example, carbon fibers are dipped in or mixed with the slurry and, after drying, the carbon fibers carrying the mixture are compression-molded in a metal mold at a temperature of, usually, 100° to 150° C. to give a carbon fiber compact body of a desired form impregnated with the mixture of silicon particles and the thermosetting resin. The method of filament winding for shaping a form is applicable to carbon fiber filaments.

The proportion of the carbon fibers and the mixture of silicon particles and the thermosetting resin in the thus prepared carbon fiber compact is selected such that the volume fraction of the carbon fibers in the finished composite body is at least 20% or, desirably, at least 30% since the mechanical strength of the composite ceramic body would be increased as the volume fraction of carbon fibers therein as a reinforcing material is increased. A volume fraction of carbon fibers of 30 to 50% can usually be obtained.

In step (c) of the inventive method, the green carbon fiber compact impregnated with the mixture of silicon particles and the thermosetting resin is subjected to a heat treatment to effect thermal decomposition of the thermosetting resin. As is mentioned before, free carbon produced by the thermal decomposition of the thermosetting resin is in an amorphous form and has unexpectedly high reactivity with elementary silicon even at a temperature lower than the melting point 1410° C. of silicon as compared with other carbonaceous materials such as graphite powders. The temperature of the heat treatment is 1300° C. or higher or, preferably, 1400° C. or higher although, as is shown later, the reaction of silicon particles with the free carbon produced from the thermosetting resin can take place even at a relatively low temperature of, for example, 1320° C. The heat-treatment temperature should not exceed 2000° C. The length of time for the heat treatment naturally depends on various factors but the reaction is usually or in most cases complete within 1 hour at 1400° C. Naturally, it is essential that the heat treatment is conducted in an atmosphere of an inert gas which is preferably a rare gas such as argon. Nitrogen gas cannot be used as the atmospheric gas due to the reactivity of elementary silicon with nitrogen to form silicon nitride at an elevated temperature.

It is a remarkable fact that the reaction between silicon and carbon to form silicon carbide proceeds preferentially between the silicon particles and the amorphous free carbon produced by the thermal decomposition of the thermosetting resin and not between the silicon particles and the carbon fibers having crystallinity more or less. This fact can be confirmed by the inspection of the fractured cross section of the finished composite body prepared according to the inventive method using a scanning electron microscope for the cross sectional profile of the carbon fibers embedded in the matrix of silicon carbide.

It is noted that the composite body prepared by the above described method is more or less porous as a consequence of dissipation of the gaseous decomposition product produced in the thermal decomposition of the thermosetting resin. It is an idea that the mechanical strength of the composite body could be further improved by filling the pores of such a porous body without affecting the carbon fibers as a reinforcing material. A further continued study conducted with this idea has led to a discovery that the bulk density of the composite body can be substantially increased by impregnating the porous composite body after step (c) with an organosilicon compound followed by a heat treatment or calcination at 1000° to 1700° C. to decompose the organosilicon compound. The organosilicon compound used here is preferably a polymeric material such as various kinds of silicones, polysilastyrenes, poly(vinyl trimethyl silanes) and the like. It is of course that the pores of such a porous composite body can be filled up by the infiltration of the porous body with molten silicon at a temperature of about 1600° C. This latter method, however, is less preferable because of the possible reaction of the molten silicon with the carbon fibers as the reinforcing material to cause a decrease in the mechanical strength of the body, especially, when the composite body after step (c) contains only a small amount of free carbon produced by the thermal decomposition of the thermosetting resin.

In the following, the method of the present invention is described in more detail by way of examples which, however, never limit the scope of the invention in any way.

Example 1

A novolac-type phenolic resin prepolymer, of which the content of carbon was about 58%, was dissolved in ethyl alcohol in a weight ratio of 1:3 to give a resin solution into which a silicon powder having an average particle diameter of about 10 μm was added in such an amount that the molar ratio of silicon to the carbon contained in the resin was 1:1 to give a slurry. Carbon fiber filaments having a diameter of about 10 μm (Carbonic HM60, a product by Petoca Co.) were dipped in the slurry and then wound up by the filament-winding method followed by drying to evaporate the solvent. A metal mold was filled with the thus dried carbon filaments coated with the mixture of the silicon particles and the resin, which were compression-molded therein at about 130° C. into a green carbon fiber compact body having dimensions of 4 mm by 10 mm by 50 mm as impregnated with the silicon particle-resin mixture. The thus prepared green bodies of carbon fiber compact were heated at 1430° C. for 1 hour in an atmosphere of argon. The composite body obtained in this way had a bulk density of about 1.8 g/cm$^3$ and a bending strength of about 200 MPa.

An X-ray powder diffractometric study was conducted for the carbon fiber composite bodies prepared in the same manner as above but by heating the green compact bodies at 1320° C., 1380° C. and 1420° C. each for 1 hour to give the diffraction diagrams shown in FIG. 1, from which it is understood that the reaction of silicon with carbon to form silicon carbide can proceed already by the heat treatment at 1320° C. and the reaction is complete by the heat treatment at 1420° C. for 1 hour. It is also noted therein that the intensity of the peaks assignable to carbon fibers are almost unchanged irrespective of the temperature of the heat treatment.

Example 2

The composite body obtained in Example 1 by the heat treatment at 1430° C. for 1 hour, which had a porosity of about 35%, was infiltrated at room temperature with a 50% by weight toluene solution of a polysilastyrene followed by calcination. This procedure of infiltration with the polymer solution and calcination was repeated three times each for 1 hour, of which the temperature in the first and second times of calcination was 1000° C. and the temperature in the third time was 1700° C. The thus obtained composite body had a bulk density of about 2.0 g/cm$^3$ and a bending strength of about 200 MPa.

Example 3

The experimental procedure was substantially the same as in Example 1 described above except that the slurry mixture of silicon particles and the phenolic resin was prepared in such a blending proportion that the molar ratio of silicon to the carbon contained in the resin was 0.7:1 instead of 1:1. The results were that the thus prepared silicon carbide-based composite body had a bulk density of about 1.7 g/cm$^3$ and a bending strength of about 300 MPa.

Comparative Example

A green carbon fiber compact body impregnated with the same phenolic resin as in Example 1 was prepared and subjected to a heat treatment at 2000° C. for 1 hour in an atmosphere of argon. This composite body was infiltrated with molten silicon at 1600° C. taking 20 minutes. An electron-microscopic study undertaken for the well-polished cross section of the thus obtained composite body indicated that the reaction was not uniform throughout the body and the carbon fibers had been partly converted into silicon carbide.

What is claimed is:

1. A method for the preparation of a silicon carbide-based composite ceramic body reinforced with carbon fibers which comprises the steps of:
   (a) mixing particles of elementary silicon and a thermosetting resin in such a proportion that the molar ratio of the silicon and the carbon in the thermosetting resin is in the range from 0.3 to 1.2 to form a mixture;
   (b) impregnating carbon fibers with the mixture prepared in step (a) to form a green carbon fiber compact impregnated with the mixture of the silicon particles and the thermosetting resin; and
   (c) heating the green carbon fiber compact at a temperature in the range from 1300° C. to 1500° C. in an atmosphere of an inert gas to effect thermal decomposition of the thermosetting resin forming free carbon and to effect the reaction of the silicon particles with the free carbon produced from the thermosetting resin to form silicon carbide.

2. The method for the preparation of a silicon carbide-based composite ceramic body reinforced with carbon fibers as claimed in claim 1 in which the thermosetting resin is a phenolic resin.

3. The method for the preparation of a silicon carbide-based composite ceramic body reinforced with carbon fibers as claimed in claim 1 in which the particles of elementary silicon have an average particle diameter not exceeding 20 μm.

4. The method for the preparation of a silicon carbide-based composite ceramic body reinforced with carbon fibers as claimed in claim 1 in which the carbon fibers are impregnated with the mixture of the silicon particles and the thermosetting resin in such an amount that the volume fraction of the carbon fibers in the composite ceramic body is at least 20%.

5. The method for the preparation of a silicon carbide-based composite ceramic body reinforced with carbon fibers as claimed in claim 1 in which the temperature of heating in step (c) is in the range from 1400° to 1500° C.

6. A method for the preparation of a silicon carbide-based composite ceramic body reinforced with carbon fibers which comprises the steps of:

(a) mixing particles of elementary silicon and a thermosetting resin in such a proportion that the molar ratio of the silicon and the carbon in the thermosetting resin is in the range from 0.3 to 1.2 to form a mixture;

(b) impregnating carbon fibers with the mixture prepared in step (a) to form a green carbon fiber compact impregnated with the mixture of the silicon particles and the thermosetting resin;

(c) heating the green carbon fiber compact at a temperature in the range from 1300° C. to 1500° C. in an atmosphere of an inert gas to effect thermal decomposition of the thermosetting resin forming free carbon and to effect the reaction of the silicon particles with the free carbon produced from the thermosetting resin to form a silicon carbide-based porous body;

(d) infiltrating the silicon carbide-based porous body with an organosilicon compound; and (e) calcining the silicon carbide-based porous body infiltrated with the organosilicon compound at a temperature in the range from 1000° to 1700° C. in an atmosphere of an inert gas.

7. The method for the preparation of a silicon carbide-based composite ceramic body reinforced with carbon fibers as claimed in claim 6 in which the organosilicon compound is a polysilastyrene.

* * * * *